M. W. MUEHLHAUSER.
EMERGENCY BRAKE.
APPLICATION FILED FEB. 27, 1909.
977,824.
Patented Dec. 6, 1910.
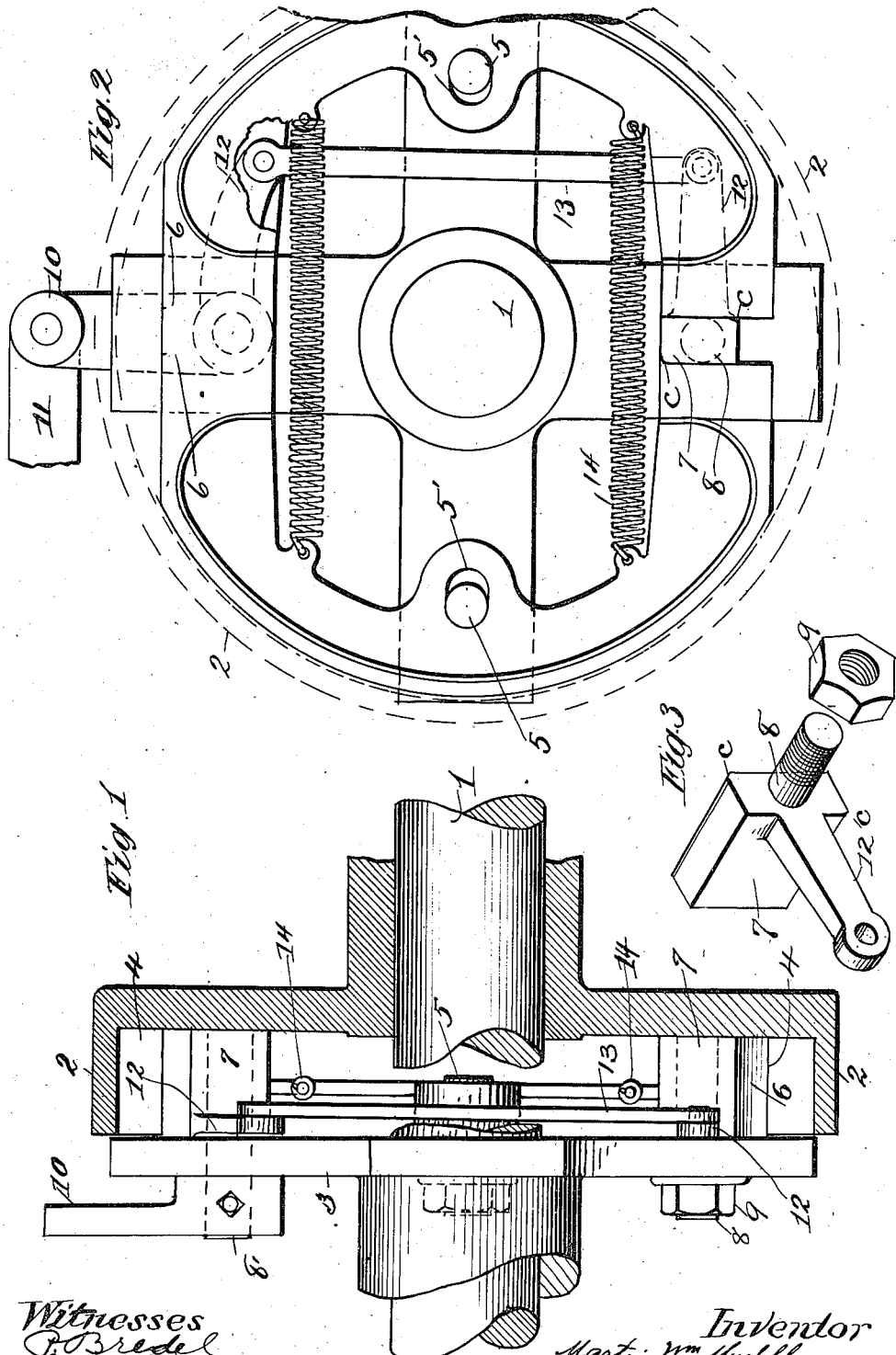

UNITED STATES PATENT OFFICE.

MARTIN WM. MUEHLHAUSER, OF CLEVELAND, OHIO, ASSIGNOR TO MORRIS S. TOWSON, OF CLEVELAND, OHIO.

EMERGENCY-BRAKE.

977,824.

Specification of Letters Patent.  Patented Dec. 6, 1910.

Application filed February 27, 1909. Serial No. 480,373.

*To all whom it may concern:*

Be it known that I, MARTIN WM. MUEHL-HAUSER, a citizen of the United States, and resident of Cleveland, in the county of Cuyahoga and State of Ohio, have invented certain new and useful Improvements in Emergency-Brakes, of which I hereby declare the following to be a full, clear, and exact description, such as will enable others skilled in the art to which it appertains to make and use the same.

The invention has reference to the class of internal or expanding brakes used in connection with the flanged hub of a wheel such as an automobile wheel. And the objects of the invention are to provide a double acting expanding device, whereby strong leverage is obtained diametrically of the flange, and the pressure is equalized thereon to obtain the maximum result of efficiency with great practicability in use. To accomplish these objects the device comprises curvilinear engaging portions which are adapted to simultaneously engage the diametrically opposed inner surfaces of the wheel flange and to make positive contact each with substantially one half of its engaging surface.

Further features of the invention are shown in the pivotal mounting of the semicylindrical members upon a common support whereby they are adapted to automatically adjust themselves to the engaged surface, and in intermediate duplicate cam shaped devices, and connected operating levers therefor, whereby the power required can be obtained in the most efficient and practical manner.

The invention further comprises the means for releasing the engaging members, and in the combination and arrangement of parts, hereinafter described, shown in the accompanying drawings, and specifically pointed out in the claims.

In the accompanying drawings Figure 1, is a longitudinal section of the device, showing the wheel flange, the supporting spider or disk and the expanding brake mechanism, Fig. 2, is a face view of the inner face thereof showing relative position of the wheel flange in dotted lines; Fig. 3, is a perspective view of one of the operating cams, and the lever integral therewith.

In these views, 1 is the shaft, such as an automobile shaft, 2, is the flange upon the wheel hub, 3, is a spider upon the shaft upon which the semicylindrical brake shoes or members 4, 4, are centrally pivoted at 5, 5, in the diametrical slots 5', 5', so as to swing freely in all directions. The opposed extremities 6, 6, of these members are flattened and are formed parallel to each other, and between each pair of opposed extremities are shown the cam blocks 7, 7, which are also pivoted in the disk or spider 3, at 8, 8', so as to turn freely. The pivot pin for each cam is extended through the spider 3, and one of them 8 is secured therein by means of a screw threaded portion and a nut 9. To the other pin 8' is secured the arm by means of which the brake is set, and it may be connected with any form of lever accessible to the operator by means of the rod 11. These cam blocks 7, 7, are provided with arms 12, 12, which for security are preferably integral therewith, and these arms are connected by means of the link 13, so that all movements of the cam which is provided with the operating arm 10, are duplicated in the other cam. Springs 14, 14, withdraw the brake members from contact with the overhanging flange 2, as soon as released.

The cams are shown of rectangular shape and with parallel sides, preferably rounded at the corners and with central pivot pins, the effect of which is to exert an equal pressure upon each brake member, the pressure being in opposite directions upon opposed members, and exactly alike for each cam.

Since the amount of expansion is slight, the cam projection need not be great and the power obtained through the levers can therefore be proportionally large.

The pivotal supports for the brake members insure adaptation thereof to wear of the surfaces, and a gripping power of uniform pressure is therefore distributed evenly over the friction surface of the flange.

The parallel sides of the cams and of the opposed extremities of the brake members, insure the precise position of these parts, since when the cams are released they will return to exact alinement and the brake members will be tightly brought up against the faces of the cams. The engaging corners C of the cams are preferably slightly rounded, but the more nearly rectangular they are the quicker the action obtained thereby.

It is obvious that the principle of operation is adapted to the employment of any number of brake members and such modications are within the spirit of the invention.

Having described the invention what I claim as new and desire to secure by Letters Patent is:

1. In an expanding brake, the combination with an overhanging flange, of a support provided with diametrically opposite pivot pins, opposed semicylindrical brake members, pivoted on said pivot pins and diametrically movable thereon, said brake members being provided with parallel opposed faces at each end, cam blocks intermediate between said parallel faces, pivotal pins for said cam blocks in said support, an operating arm for one cam block secured to the corresponding pivotal pin, levers secured to said cam blocks, a link connecting said levers, and releasing springs connecting said brake members.

2. In an expanding brake, in combination a shaft, an overhanging hub and flange thereon, a disk support or spider on said shaft, duplicate curvilinear brake members adapted to engage said flange and pivoted in said support, the said brake members provided with radial slots in which said pivots are movably secured, said brake members having parallel opposed surfaces at their extremities, duplicate cams pivoted in said support, duplicate levers secured to said cams, a connecting link between said levers, an operating arm for one of said cams, said cams adapted to turn simultaneously on their pivots, and means for releasing said brake members.

3. In an expanding brake, in combination, a shaft, an overhanging hub and flange thereon, a disk on said shaft, duplicate curvilinear brake members adapted to engage said flange, and pivotally connected with said disk intermediate of their ends and having radial movement thereon, said brake members having parallel opposed surfaces at their extremities, duplicate cams pivoted in said disk, duplicate operating levers therefor, a connecting link between said levers, an operating arm for one of said cams, and duplicate springs for automatically releasing said brake members.

In testimony whereof, I hereunto set my hand this 7th day of February 1909.

MARTIN WM. MUEHLHAUSER.

In presence of—
GEO. S. COLE,
WM. M. MONROE.